Patented Sept. 14, 1943

2,329,433

UNITED STATES PATENT OFFICE 2,329,433

TRI-(β-CARBOXYETHYL)-ACETONE

Herman A. Bruson, Philadelphia, Pa., assignor to The Resinous Products & Chemical Company, Philadelphia, Pa., a corporation of Delaware No Drawing. Application October 17, 1941, Serial No. 415,405

3 Claims. (Cl. 260—537)

This invention relates to tri-(β-carboxyethyl)-acetone, a new compound which is a useful intermediate for the preparation of plasticizers and synthetic resins.

According to this invention, tri-(β-carboxyethyl)-acetone is obtained by hydrolyzing tri-(β-cyanoethyl)-acetone which is in turn obtained by condensing acetone with acrylonitrile in the presence of alkaline condensing agents, as described in copending application Serial No. 389,332, filed April 19, 1941, of which this application is a continuation-in-part.

The hydrolysis is carried out by boiling tri-(β-cyanoethyl)-acetone in the presence of aqueous mineral non-oxidizing acids such as hydrochloric or sulfuric acid or in the presence of alkalies such as sodium hydroxide or potassium hydroxide solutions, so as to eliminate ammonia completely. The salts thus obtained may be converted to the acid upon acidification. It is surprising that under such drastic conditions of hydrolysis very little cleavage of the rest of the molecule occurs.

In order to illustrate this invention, the following example is given:

*Condensation of acetone and acrylonitrile*

To a mixture consisting of 38 grams of acetone and 100 grams of tertiary butanol cooled to 10° C. there is added 5 grams of aqueous 40% trimethyl benzyl ammonium hydroxide and, while the mixture is stirred, there is added dropwise thereto 53 grams of acrylonitrile during a period of a half hour while the reaction temperature is maintained between 10° and 15° C. by cooling in an ice bath. After about one-fourth of the acrylonitrile has been added, the product begins to crystallize. Stirring is continued for two hours at 10–20° C. after all the acrylonitrile has been added, and then for three hours longer at ordinary room temperature. The reaction mixture is then made slightly acid to litmus by adding a 10% hydrochloric acid solution, whereupon the solution lightens in color. The crystals are filtered off by suction; the yield is 50.5 grams.

Upon recrystallization from boiling water or from glycol monoethyl ether ("Cellosolve"), the tri-(β-cyanoethyl)-acetone forms colorless crystals melting at 154° C.

*Hydrolysis of tri-(β-cyanoethyl)-acetone*

A mixture consisting of 140 grams of potassium hydroxide, 800 cc. of water, and 120 grams of tri-(β-cyanoethyl)-acetone was boiled under reflux for four hours. The solution was mixed with a little bleaching charcoal, cooled to about 50° C., and filtered. The filtrate was acidified with hydrochloric acid until it gave a blue color with Congo Red indicator and then evaporated to dryness under reduced pressure on a steam bath. The pale yellow solid was extracted with hot acetone. Upon cooling, the filtered acetone extract, tri-(β-carboxyethyl)-acetone, separated in crystalline form in a yield of about 75–80 grams of the pure product. More may be obtained by evaporation of the acetone. It consists of colorless needles melting at 149–150° C. which are readily soluble in water or in ethanol. It has the probable formula:

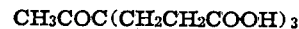

$$CH_3COC(CH_2CH_2COOH)_3$$

and its triethyl ester:

$$CH_3COC(CH_2CH_2COOC_2H_5)_3$$

is a colorless oil boiling at 205° C./1 mm., having $d^{25}$ 1.0994 and $N^{25}_D$ 1.4617.

I claim:

1. As a new compound, tri-(β-carboxyethyl)-acetone

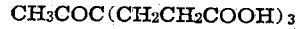

$$CH_3COC(CH_2CH_2COOH)_3$$

which, when pure, consists of water-soluble crystals melting at 149–150° C.

2. A method of preparing tri-(β-carboxyethyl)-acetone, which comprises hydrolyzing tri-(β-cyanoethyl)-acetone.

3. A method of preparing tri-(β-carboxyethyl)-acetone, which comprises hydrolyzing tri-(β-cyanoethyl)-acetone by means of excess aqueous alkali metal hydroxide solution and acidifying the hydrolysate.

HERMAN A. BRUSON.